H. H. MOELLER.
VALVE CONTROLLING MEANS FOR INTERNAL COMBUSTION ENGINES.
APPLICATION FILED FEB. 24, 1919.
1,362,500.
Patented Dec. 14, 1920.
3 SHEETS—SHEET 1.
Fig. 1.
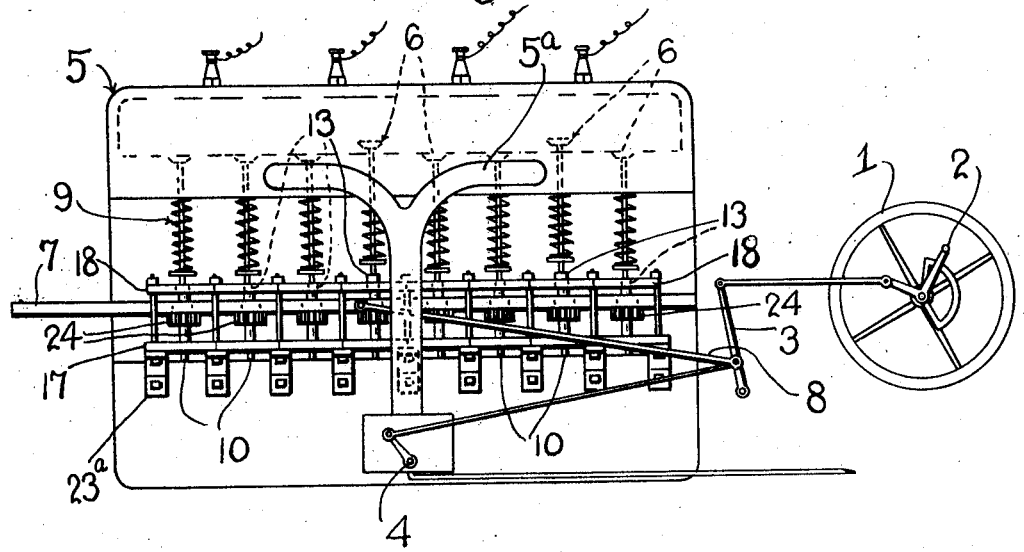
Fig. 3.
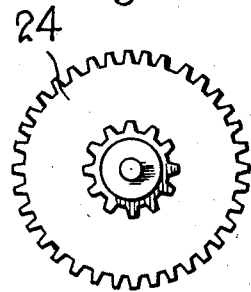
Fig. 5.
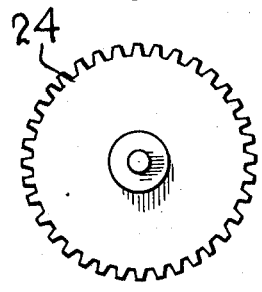
Fig. 4.
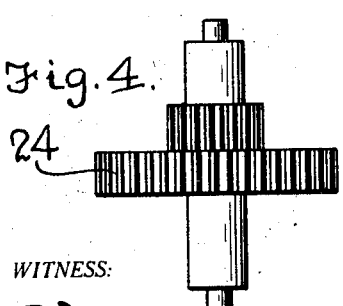
Fig. 6.
WITNESS:
INVENTOR.
H. H. Moeller
BY
ATTORNEY.

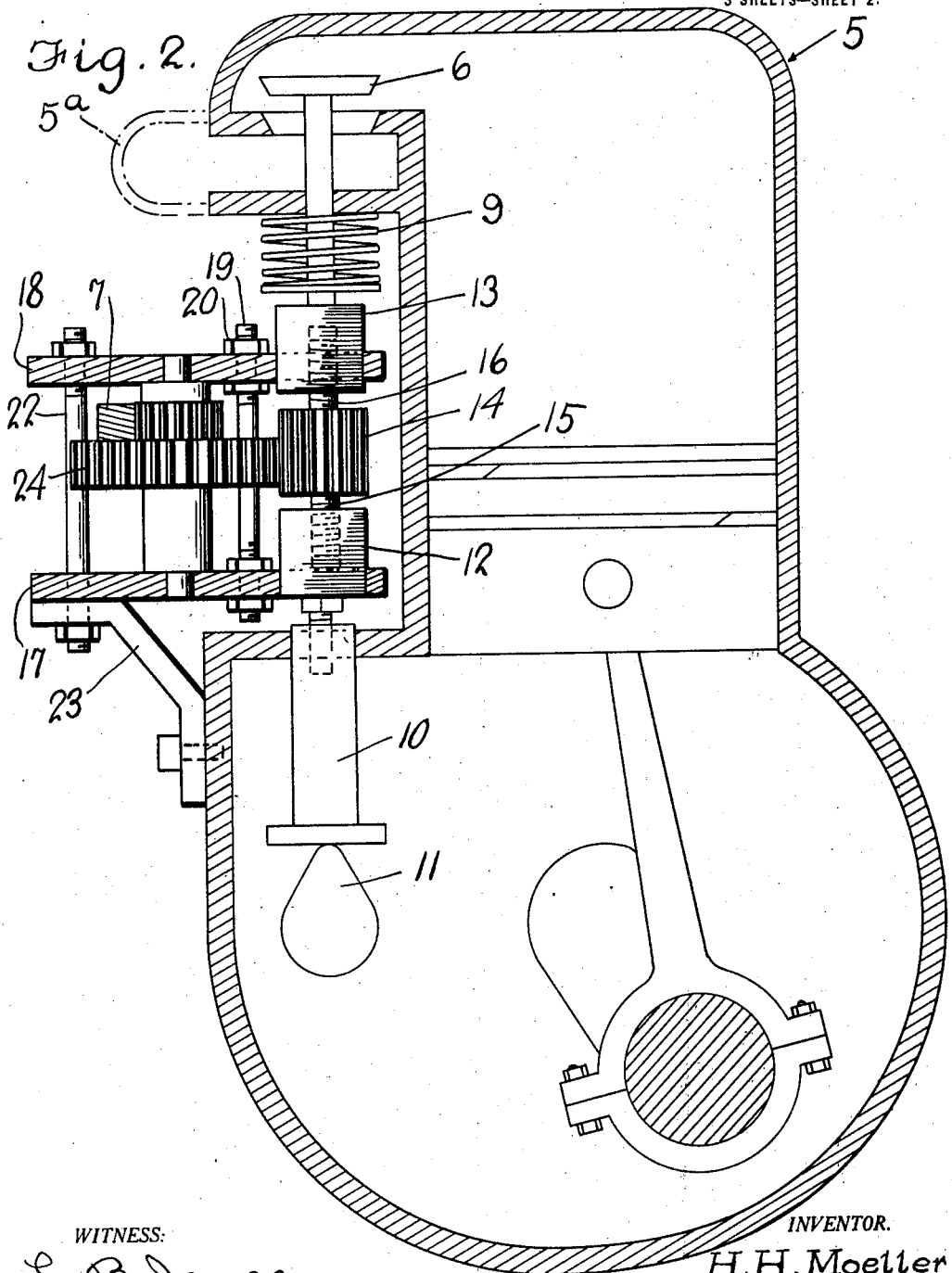

H. H. MOELLER.
VALVE CONTROLLING MEANS FOR INTERNAL COMBUSTION ENGINES.
APPLICATION FILED FEB. 24, 1919.
1,362,500. Patented Dec. 14, 1920.
3 SHEETS—SHEET 3.
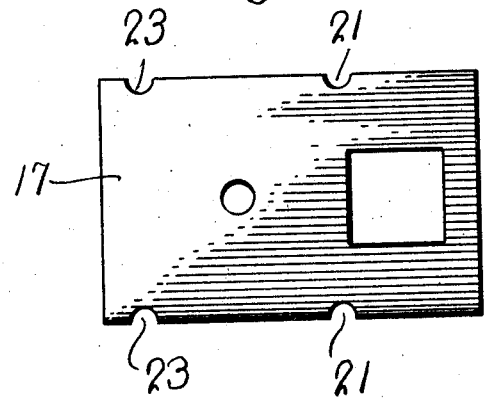
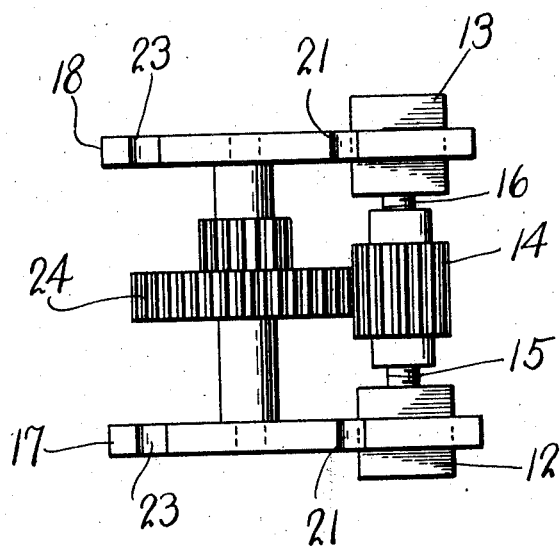
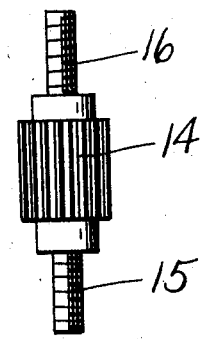
INVENTOR.
H. H. Moeller
BY
Victor J. Evans
ATTORNEY.

UNITED STATES PATENT OFFICE.

HENRY H. MOELLER, OF COUNCIL BLUFFS, IOWA.

VALVE-CONTROLLING MEANS FOR INTERNAL-COMBUSTION ENGINES.

1,362,500.   Specification of Letters Patent.   Patented Dec. 14, 1920.

Application filed February 24, 1919. Serial No. 278,607.

*To all whom it may concern:*

Be it known that I, HENRY H. MOELLER, a citizen of the United States, residing at Council Bluffs, in the county of Pottawattamie and State of Iowa, have invented new and useful Improvements in Valve-Controlling Means for Internal-Combustion Engines, of which the following is a specification.

My present invention pertains to internal combustion engines, and consists in the provision of means whereby the exhaust or intake valve of an engine may be opened and closed in proportion to the opening and closing of the valve for controlling the supply of explosive mixture to the engine whereby the efficiency of the engine is increased and undue heating of the same is averted.

The invention also consists in the peculiar and advantageous exhaust valve-opening and closing means.

With the foregoing in mind, the invention in all of its details will be fully understood from the following description and claims when the same are read in connection with the drawings, accompanying and forming part of this specification, in which:

Figure 1 is a view, partly diagrammatic in character, and showing the preferred installation of my invention.

Fig. 2 is a view on an enlarged scale showing the opening and closing means constructed in accordance with my invention for use in the control of the exhaust valve of an engine cylinder.

Figs. 3, 4 and 5 are detail views of the duplex gear comprised in said opening and closing means.

Fig. 6 is a detail view of the rack for coöperating with the comparatively small portion of said gear.

Fig. 7 is a plan view of one of the bearing plates of my improvement.

Fig. 8 is a detail elevation showing the two bearing plates, the duplex gear and the endwise movable gear, as well as the mountings complementary to the latter.

Fig. 9 is a detail elevation of the endwise movable gear.

Similar numerals of reference designate corresponding parts in all of the views of the drawings.

By reference to Fig. 1 it will be observed that the steering wheel 1 of an automobile is provided with a hand lever 2, and that said hand lever is connected with a lever 3, which, in turn, is connected with a valve 4 for controlling the supply of explosive mixture to the several cylinders of a multi-cylinder internal combustion engine 5; the said engine being preferably equipped with an intake manifold 5ª of conventional or any other approved type compatible with the purpose of my invention.

One part of my invention contemplates the opening and closing of the exhaust valves 6 of the cylinders comprised in the engine 5 consonant with the operation of the valve 4, and therefore I connect a rack bar 7 with the lever 3 through the medium of a pitman 8 or other suitable means.

Each of the engine cylinders is provided in combination with the rack bar 7 with an exhaust valve 6 before mentioned, and with the driving connection shown in Fig. 2; each of the said driving connections being designed to derive motion from the rack bar 7. Therefore a detailed description of the driving connection as shown in Fig. 2 will suffice to impart a definite understanding of all. By reference to Fig. 2, it will be understood that the valve 6 is normally closed by a spring 9; also, that the valve 6 is alined with the usual plunger 10, designed to be moved in one direction by the conventional cam 11. Interposed between the valve 6 and the plunger 10 is a portion of my improvement which portion comprises endwise movable bearing blocks 12 and 13, and the endwise movable gear 14; the said gear being fixed with respect to lower and upper threaded portions 15 and 16; the lower portion 15 being provided with a right-hand thread, and the upper portion 16 with a left-hand thread. The blocks 12 and 13 are provided with sockets threaded appropriately to the portions 15 and 16, respectively, whereby it will be apparent that rotation of the gear 14 in one direction will be attended by movement of the blocks 12 and 13 away from each other, while the rotation of the gear 14 in the opposite direction will be accompanied by movement of the blocks 12 and 13 toward each other. The blocks 12 and 13 are of angular form in cross-section and hence they will be held against any movement except the rectilinear movement alluded to. Said blocks 12 and 13 are disposed and guided and held against rotation in apertured spaced plates 17 and 18; the said plates 17 and 18 being connected together and maintained in proper relation by bolts 19 and nuts 20 thereon; the said bolts being disposed in recesses 21 in the edges of the plates, while the nuts 20 are arranged above and below the plates. Additional bolts 22 disposed in recesses 23 of the plates 17 and 18 serve to effect strong and rigid connection of the plates to a bracket 23ᵃ that is fixed with respect to the engine casing. The plates 17 and 18 serve also for the mounting of the duplex gear that is numbered 24, the comparatively small portion of said duplex gear being intermeshed with the rack bar 7, and the large portion thereof being intermeshed with the gear 14.

It will be apparent from the foregoing that rectilinear movements of the rack bar 7 brings about up and down movements of the valves 6 of the engine, and hence irrespective of the speed at which the engine is operated there will be no overheating thereof. It will also be apparent that by reason of the connections shown in Fig. 1, the movements of the rack bar 7 will be consonant with the movement of the valve 4. From this it follows that the exhaust of the engine will be as perfect when the engine is running at a low rate of speed as when it is operated at a high rate of speed, and there will be no undue heating of the engine or waste of explosive mixture.

Manifestly in the installation of my invention shown in Fig. 1, the intake valves of the engine may be operated in the ordinary well known manner through the medium of valve gear, and when deemed expedient my improved valve-controlling means may be used in conjunction with the valve gear of intake valve as well as in conjunction with the valve gear of exhaust valve.

Having described my invention, what I claim and desire to secure by Letters-Patent, is:

1. In an internal combustion engine, the combination of a valve, a lifting means complementary thereto, a gear arranged endwise between the valve and lifting means and having oppositely threaded portions, rectilinearly movable members held against rotation and having correspondingly threaded bores receiving said threaded portions of the gear, a duplex gear having a portion in engagement with the first-named gear and also having an auxiliary portion and a reciprocatory bar engaged with and adapted to transmit motion to said auxiliary portion.

2. In an internal combustion engine, the combination of a valve, a lifting means complementary thereto, spaced plates connected together by bolts disposed in notches thereof and nuts and arranged at right angles to the line of movement of the valve, means connecting said plates with the engine frame, members movable rectilinearly and held against rotation in the plates, between the valve and lifting means, and having oppositely threaded bores, an endwise movable spur gear interposed between the members and having oppositely threaded portions arranged in the bores thereof, a duplex gear mounted between the plates and having a portion intermeshed with said gear and a comparatively small portion, and a rack bar intermeshed with said comparatively small portion of the duplex gear.

In testimony whereof I affix my signature.

HENRY H. MOELLER.